(12) United States Patent
Rheaume et al.

(10) Patent No.: US 10,329,027 B2
(45) Date of Patent: *Jun. 25, 2019

(54) FUEL DEOXYGENATION SYSTEMS

(71) Applicant: Hamilton Sundstrand Corporation, Charlotte, NC (US)

(72) Inventors: Jonathan Rheaume, West Hartford, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/211,376

(22) Filed: Jul. 15, 2016

(65) Prior Publication Data

US 2018/0016025 A1    Jan. 18, 2018

(51) Int. Cl.
*B01D 19/00* (2006.01)
*B64D 37/32* (2006.01)
*B64D 37/34* (2006.01)

(52) U.S. Cl.
CPC ......... *B64D 37/34* (2013.01); *B01D 19/0005* (2013.01); *B01D 19/0031* (2013.01); *B64D 37/32* (2013.01); *Y02T 50/44* (2013.01)

(58) Field of Classification Search
CPC ................ B01D 19/0005; B01D 19/0031; B01D 53/22; B64D 37/32; B64D 37/34
See application file for complete search history.

(56) References Cited

U.S. PATENT DOCUMENTS

| | | | | |
|---|---|---|---|---|
| 5,611,841 A | * | 3/1997 | Baker | B01D 53/22 95/50 |
| 5,843,212 A | * | 12/1998 | Nanaji | B01D 53/22 96/4 |
| 6,315,815 B1 | | 11/2001 | Spadaccini et al. | |

(Continued)

FOREIGN PATENT DOCUMENTS

WO    WO-0228714 A1    4/2002

OTHER PUBLICATIONS

Extended European Search Report dated Nov. 16, 2017, issued during the prosecution of corresponding European Patent Application No. EP 17181295.1 (7 pages).

*Primary Examiner* — Jason M Greene
(74) *Attorney, Agent, or Firm* — Locke Lord LLP; Scott D. Wofsy; Daniel J. Fiorello

(57) ABSTRACT

A fuel deoxygenation system for an aircraft includes a hydrocarbon recycler configured to recycle hydrocarbon gas into fuel. The hydrocarbon recycler includes a housing that partially defines an ullage channel configured to fluidly communicate with both an ullage of an aircraft fuel tank and a vent, wherein the housing partially defines a hydrocarbon recirculation channel configured to fluidly communicate with a liquid portion of a fuel tank. The hydrocarbon recycler also includes a membrane defining a sealing wall between the ullage channel and the hydrocarbon recirculation channel such that the membrane is in fluid communication with both the ullage channel and the hydrocarbon recirculation channel, wherein the membrane is configured to be permeable to hydrocarbons such that hydrocarbons in the ullage channel can pass through the membrane to the hydrocarbon recirculation channel and oxygen in the ullage channel to passes through to be vented.

16 Claims, 5 Drawing Sheets

(56) References Cited

U.S. PATENT DOCUMENTS

| | | |
|---|---|---|
| 6,820,659 B2 | 11/2004 | Sauer |
| 6,830,219 B1* | 12/2004 | Picot ................ B01D 19/0005 |
| | | 244/121 |
| 6,887,300 B2 | 5/2005 | Nemser |
| 7,153,343 B2 | 12/2006 | Burlatsky et al. |
| 8,128,739 B1 | 3/2012 | Gupta |
| 8,388,740 B2 | 3/2013 | Sohn et al. |
| 9,096,326 B2 | 8/2015 | Dooley et al. |
| 9,114,886 B2 | 8/2015 | Gupta |
| 2002/0192831 A1* | 12/2002 | Fournier ............. B67D 7/0486 |
| | | 436/139 |
| 2005/0000353 A1* | 1/2005 | Nemser ................ B01D 53/22 |
| | | 95/50 |
| 2006/0278073 A1 | 12/2006 | McHugh |
| 2009/0139496 A1* | 6/2009 | Rea ................... B01D 53/0431 |
| | | 123/520 |
| 2014/0208943 A1* | 7/2014 | Gupta ................... B64D 37/32 |
| | | 95/14 |
| 2014/0252171 A1* | 9/2014 | Dooley ................ B64D 37/32 |
| | | 244/129.2 |
| 2017/0368496 A1* | 12/2017 | Rheaume ............. B01D 53/22 |

\* cited by examiner

FUEL DEOXYGENATION SYSTEMS

BACKGROUND

1. Field

The present disclosure relates to heat engines, more specifically to fuel deoxygenation systems (e.g., for jet fuel).

2. Description of Related Art

Dissolved oxygen is typically present in kerosene-based fuel at a concentration of approximately 70 ppm. Fuel stabilization by removal of oxygen avoids formation of carbonaceous deposits at elevated fuel temperatures and enables higher capability thermal management of engine accessories. Conventional methods to deoxygenate fuel have deficiencies. Membrane-based oxygen removal from liquid fuel suffers from inefficient gas transport through liquid media to reach membranes. As a result, membrane units for liquid degassing tend to be large and power-intensive.

Sparging (displacement of dissolved oxygen by bubbling nitrogen through fuel) has the undesired effect of removing lighter hydrocarbons which physically alters the fuel composition. This can make combustor relight at altitude difficult, for example. Also, sparging gas is not readily available on conventional aircraft. Technology that removes oxygen from fuel without these drawbacks would make fuel stabilization more practical.

Conventional methods have been unsatisfactory for on-board fuel deoxygenation. Liquid fuel de-oxygenation systems that utilize membranes have been too large to be practical on aircraft. There is still a need in the art for improved fuel deoxygenation systems. The present disclosure provides a solution for this need.

SUMMARY

In accordance with at least one aspect of this disclosure, a fuel deoxygenation system for an aircraft includes a hydrocarbon recycler configured to recycle hydrocarbon vapor into fuel. The hydrocarbon recycler includes a housing that partially defines an ullage channel configured to fluidly communicate with both an ullage of an aircraft fuel tank and a vent, wherein the housing partially defines a hydrocarbon recirculation channel configured to fluidly communicate with a liquid portion of a fuel tank.

The hydrocarbon recycler also includes a membrane defining a sealing wall between the ullage channel and the hydrocarbon recirculation channel such that the membrane is in fluid communication with both the ullage channel and the hydrocarbon recirculation channel, wherein the membrane is configured to be permeable to hydrocarbons such that hydrocarbons in the ullage channel can pass through the membrane to the hydrocarbon recirculation channel and oxygen in the ullage channel passes through to be vented.

The membrane can be a reverse-selective membrane. Any other suitable membrane is contemplated herein.

The system can further include a sparging gas supply in fluid communication with the liquid portion of the fuel tank for supplying a sparging gas (e.g., an inert gas such as nitrogen) to the liquid fuel. The sparging gas supply can include an electro-chemical converter to produce sparging gas onboard the aircraft. Any other suitable sparging gas supply (e.g., inert gas stored in a tank) is contemplated herein.

In certain embodiments, the sparging gas supply can be in fluid communication with fuel tank through the hydrocarbon recirculation channel to sweep the hydrocarbon recirculation channel. The system can include a fuel tank inerting system in fluid communication with the ullage of the fuel tank to provide the ullage with an inerting gas.

The system can include a sparging gas separator disposed between the hydrocarbon recycler and the vent configured to recirculate sparging gas to the system and to pass oxygen to the vent.

In certain embodiments, a prime mover can be disposed in fluid communication with the hydrocarbon recirculation channel to pressurize the hydrocarbon vapor to flow to the liquid portion of the fuel tank and bubble into the liquid fuel. An ullage prime mover can be disposed in fluid communication with the ullage and configured to pressurize ullage gas to flow to the hydrocarbon recycler. Any other suitable pressurization to cause suitable hydrocarbon recirculation, tank inerting, and/or sparging is contemplated herein.

In accordance with at least one aspect of this disclosure, a method for deoxygenating fuel in an aircraft includes sparging a liquid fuel of a fuel tank with a sparging gas to displace oxygen from the liquid fuel into an ullage of the fuel tank to create an ullage gas, separating hydrocarbons from the ullage gas, venting the ullage gas containing oxygen after separating hydrocarbons from the ullage gas, and recirculating the hydrocarbons into the liquid fuel. The sparging gas can include nitrogen and/or any other suitable inert gas.

Separating hydrocarbons can include passing the ullage gas over a reverse-selective membrane that is configured to permeate hydrocarbons and not oxygen. The sparging gas can serve to inert the ullage of the fuel tank. Any other suitable method and/or system to separate/recirculate hydrocarbons and vent oxygen is contemplated herein.

The method can include separating the sparging gas from the ullage gas before venting the ullage gas. In certain embodiments, the method can include recirculating the sparging gas to the liquid fuel.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
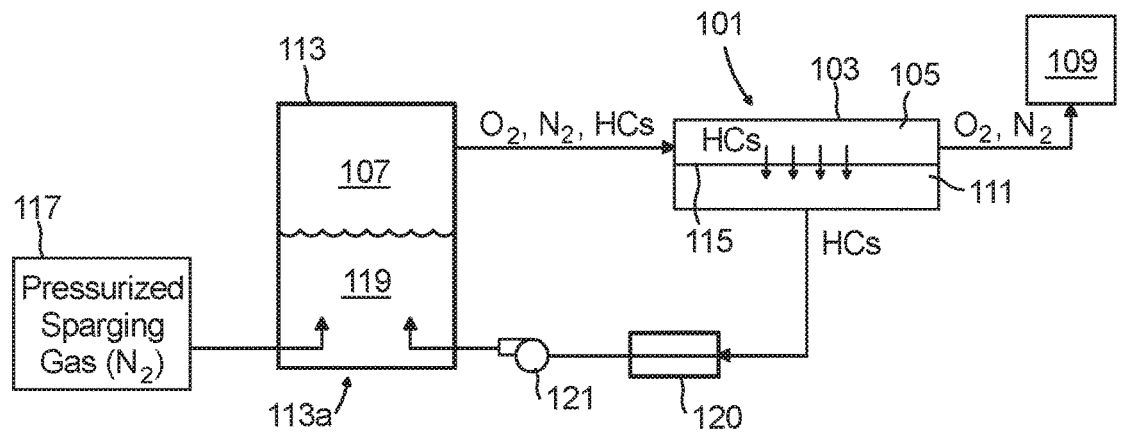
FIG. 1 is a schematic view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-7. The systems and methods described herein can be used to deoxygenate fuel while returning lost hydrocarbons to the fuel to prevent change in fuel composition and engine performance.

Referring to FIG. 1, a fuel deoxygenation system 100 for an aircraft includes a hydrocarbon recycler 101 configured to recycle hydrocarbon vapor into liquid fuel. The recirculated hydrocarbon vapors may condense in the liquid fuel. The hydrocarbon recycler 101 includes a housing 103 that partially defines an ullage channel 105 configured to fluidly communicate with both an ullage 107 of an aircraft fuel tank and a vent 109. The housing 103 partially defines a hydrocarbon recirculation channel 111 configured to fluidly communicate with a liquid portion 113a of a fuel tank 113.

The hydrocarbon recycler 101 also includes a membrane 115 defining a sealing wall between the ullage channel 105 and the hydrocarbon recirculation channel 111 such that the membrane 115 is in fluid communication with both the ullage channel 105 and the hydrocarbon recirculation channel 111. The membrane 115 is configured to be permeable to hydrocarbons such that hydrocarbons in the ullage channel 105 can pass through the membrane 115 to the hydrocarbon recirculation channel 111. As shown, oxygen in the ullage channel 105 passes through to be vented at the vent 109.

The membrane 115 can be a reverse-selective membrane (e.g., a silicone rubber) as appreciated by those having ordinary skill in the art. Examples of materials that can have selectivity for hydrocarbon vapors can include silicone rubbers (e.g., polydimethyl siloxane, polyoctylmethyl siloxane), polyethers (e.g., a copolymer of poly(ethylene oxide) (PEO) and poly(butylene therephthalate) (PBT)), poly(4-methyl-2-pentyne), and/or poly-trimethyl-silyl-propyne (PTMSP). Any other suitable membrane is contemplated herein.

The separated hydrocarbons can be returned back to the liquid fuel 119 through any suitable means. For example, a nozzle can be disposed in the tank 113 and configured to bubble the hydrocarbon vapor. Embodiments of a nozzle can create small diameter bubbles with high surface area for the gases to dissolve in liquid fuel efficiently.

The system 100 can further include a sparging gas supply 117 in fluid communication with the liquid portion 113a of the fuel tank 113 for supplying a sparging gas (e.g., an inert gas such as nitrogen, argon) to the liquid fuel 119 within the tank 113. The sparging gas supply 117 can include an electro-chemical converter to produce sparging gas onboard the aircraft as appreciated by those having ordinary skill in the art. The electro-chemical converter can deplete oxygen at the cathode and thus generate inert gas from air, for example, with very high purity possible. Any other suitable sparging gas supply (e.g., a tank) is contemplated herein.

The sparging gas flow can be regulated as a function of dissolved oxygen concentration. In certain cases, target concentration in liquid fuel 119 is on the order of single digit ppm. If the concentration of oxygen in the liquid fuel 119 is high, then the sparging gas flow can be increased which can increase the rate of oxygen removal.

In certain embodiments, the recirculated hydrocarbon vapors may condense in the liquid fuel if the fuel is of sufficient quantity and at an appropriate temperature. In certain embodiments, a heat exchanger 120 can be located between hydrocarbon recycler 101 and tank 113. In such embodiments, the heat exchanger 120 can condense hydrocarbon vapors prior to reintroduction into the tank 113. The heat exchanger 120 can be in thermal communication with ram air if sufficiently cold and/or a vapor cycle, air cycle, and/or thermoelectric device may be used to provide cooling to the heat exchanger 120.

Figure 2:
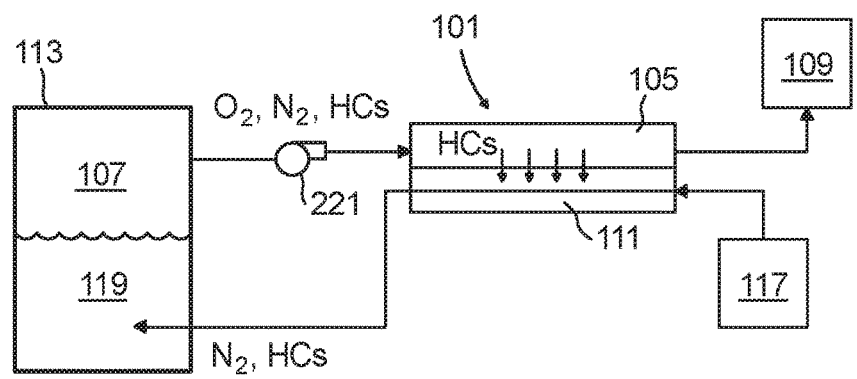
FIG. 2 is a schematic view of an embodiment of a system in accordance with this disclosure.

In certain embodiments, a prime mover 121 can be disposed in fluid communication with the hydrocarbon recirculation channel 111 to pressurize the hydrocarbon vapor to flow to the liquid portion 113a of the fuel tank 113 and bubble into the liquid fuel 119. Referring to FIG. 2, in certain embodiments, a system 200 can have the sparging gas supply 117 in fluid communication with fuel tank 113 through the hydrocarbon recirculation channel 111 to sweep the hydrocarbon recirculation channel 111 (e.g., to pressurize the hydrocarbon vapor to bubble into the liquid fuel 119).

An ullage prime mover 221 can be disposed in fluid communication with the ullage 107 and configured to pressurize ullage gas to flow to the hydrocarbon recycler 101. The ullage prime mover 221 can help evolve oxygen from the liquid fuel 119 by reducing pressure in the fuel tank 113, for example (which also happens as a function of increasing altitude).

While prime movers 121, 221 are disclosed hereinabove in specific locations, any other suitable pressurization source and/or device to cause suitable hydrocarbon recirculation, tank inerting, and/or sparging is contemplated herein.

Figure 3:
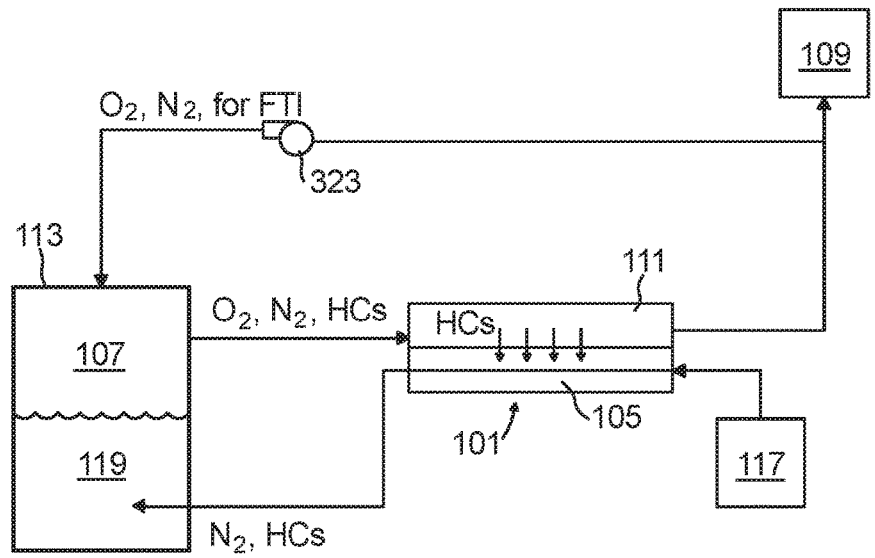
FIG. 3 is a schematic view of an embodiment of a system in accordance with this disclosure.

Referring to FIG. 3, for example, a system 300 can include a fuel tank inerting system 323 in fluid communication with the ullage 107 of the fuel tank to provide the ullage 107 with an inerting gas (e.g., nitrogen). Such tank inerting systems 323 can prevent an explosive atmosphere from forming within the tank 113, for example, and can include any suitable components known to those having ordinary skill in the art.

As shown in FIG. 3, the inerting system 323 may act to pressurize the ullage 107 by pulling fluid from downstream of the hydrocarbon recycler 101 which includes inert gas from the sparging gas supply 117. This might also pull in outside air, in which case any suitable flow regulator for flow regulation can be included (e.g., at the vent 109). The inerting system 323 can then recycle this gas into the ullage which causes it to take hydrocarbon vapor in the ullage 107 with it to the hydrocarbon recycler 111. The amount of sparging gas can be added as needed to resupply the fuel tank inerting system 323 with the inert gas. Any other source for inerting gas is contemplated herein for use in the inerting system 323.

While embodiments are described as having a separate inerting system 323, sparging gas can be used to take over the role of the inerting system 323, eliminating or reducing the output demanded from a fuel tank inerting system. When the sparging gas bubbles up through the fuel and enters the ullage, it displaces gases in the ullage causing oxygen and other gases to exit the ullage. In this way, the sparging gas reduces the ullage oxygen concentration and lowers the chances for an explosion or a fire. Air usually has about 21% oxygen content by volume, whereas the sparging gas will entrain dissolved oxygen from the fuel, the quantity of which is orders of magnitude lower (e.g., up to about 70 parts per million) than oxygen in in air (21% is about 210,000 parts per million). Therefore, introducing sparging gases that contain a small quantity of oxygen into the mixture of gases in the ullage including oxygen and fuel vapor causes the mixture to remain below the lower explosive limit.

Figure 4:
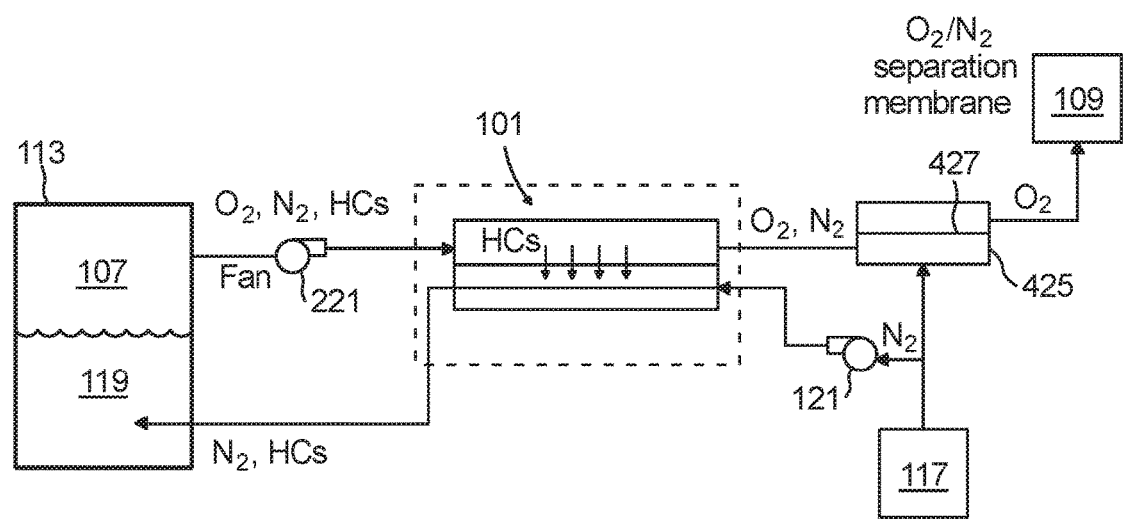
FIG. 4 is a schematic view of an embodiment of a system in accordance with this disclosure.

In certain embodiments, referring to FIG. 4, a system 400 can include sparging gas separator 425 disposed between the hydrocarbon recycler 101 and the vent 109. The sparging gas separator 425 can be configured to recirculate sparging gas to the system 400 and to pass oxygen to the vent 109. This conserves sparging gas and reduces the power requirement for creating of inert gas on the aircraft in flight. The sparging gas separator 425 can have a similar construction as hydrocarbon recycler 101, however, the membrane 427 can be selected to be mostly permeable to oxygen and mostly impermeable to the inert sparging gas. Any other suitable mechanism to separate the inert gas from oxygen is contemplated herein (e.g., an electro-chemical device with suitable ancillary hardware).

Figure 5:
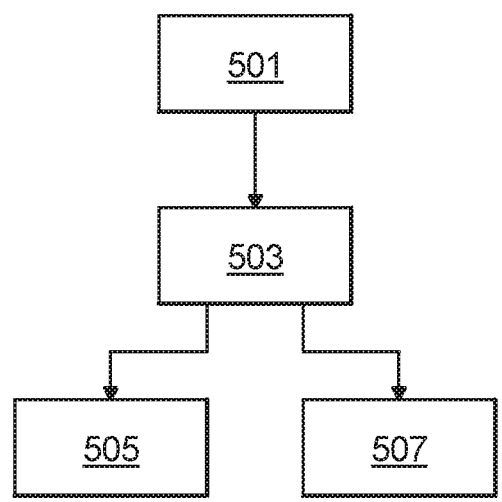
FIG. 5 is a flow diagram of an embodiment of a method in accordance with this disclosure.

In accordance with at least one aspect of this disclosure, referring to FIG. 5, a method 500 for deoxygenating fuel in an aircraft includes sparging (e.g., at block 501) a liquid fuel 119 of a fuel tank 113 with a sparging gas to displace oxygen from the liquid fuel 119 into an ullage 107 of the fuel tank 113 to create an ullage gas (e.g., which includes a mixture of oxygen, hydrocarbons, and the sparging gas). The method 500 can further include separating (e.g., at block 503) hydrocarbons from the ullage gas.

The method further includes venting (e.g., at block 505) the ullage gas containing oxygen after separating hydrocarbons from the ullage gas. The method also includes recirculating (e.g., at block 507) the hydrocarbons into the liquid fuel 119. As described above, the sparging gas can include nitrogen and/or any other suitable inert gas.

Separating hydrocarbons (e.g., at block 503) can include passing the ullage gas over a reverse-selective membrane that is configured to permeate hydrocarbons and not oxygen. Any other suitable method and/or system to separate/recirculate hydrocarbons and vent oxygen is contemplated herein.

The method can include separating the sparging gas from the ullage gas before venting the ullage gas. In certain embodiments, the method can include recirculating the sparging gas to the liquid fuel 119. Also as shown above, the method can include using the sparging gas to sweep the separated hydrocarbons and reintroduce the separated hydrocarbons back into the liquid fuel 119.

Figure 6:
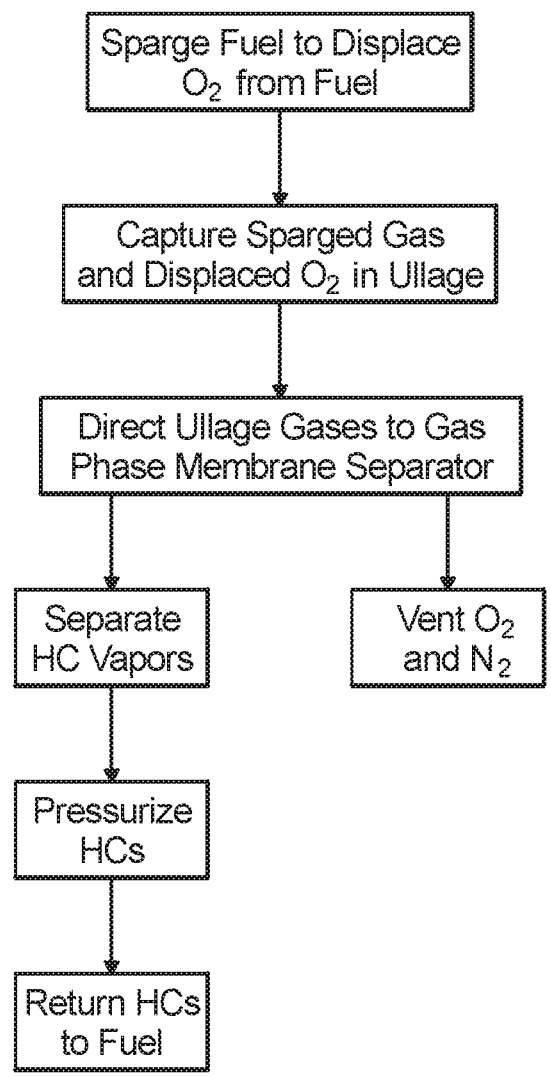
FIG. 6 is a flow diagram of another embodiment of a method in accordance with this disclosure.
Figure 7:
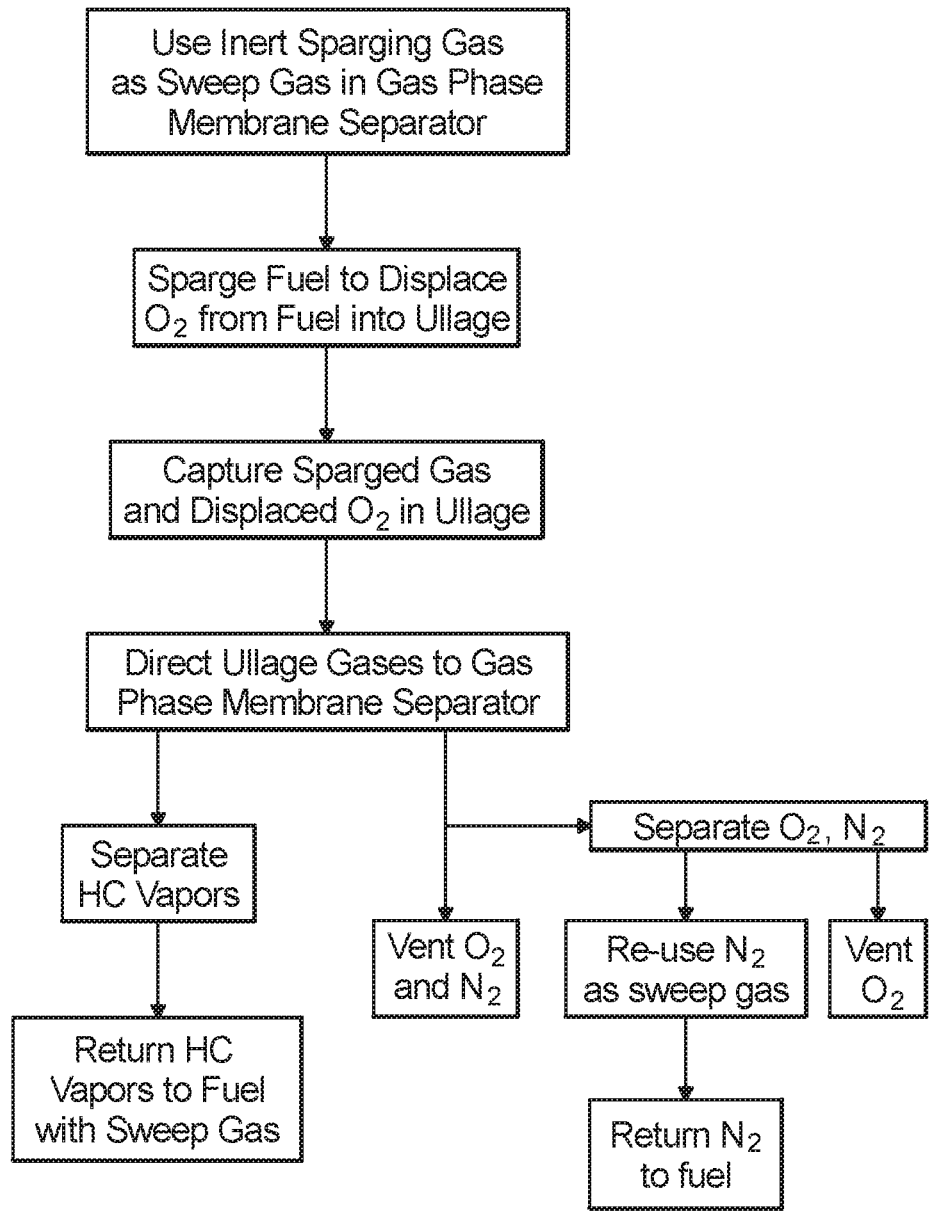
FIG. 7 is a flow diagram of another embodiment of a method in accordance with this disclosure.

FIG. 6 shows an embodiment of a method 600 in accordance with this disclosure. FIG. 7 shows another embodiment of a method 700 in accordance with this disclosure. One or more portions of methods 600, 700 may be included in one or more portions of method 500 as described above and vice versa.

As described above, embodiments utilizing gas phase separation membranes are vastly more effective, lighter weight, and more compact than those for liquid separation. Gas phase separation is more efficient due to better mass transport than in liquid phase separation. In embodiments, fuel stabilization is accomplished through sparging fuel, using a gas phase separation membrane to recover hydrocarbons, and returning them to the fuel. Embodiments of membranes dissolve hydrocarbon vapors preferentially over oxygen and nitrogen, for example. The hydrocarbons diffuse through the membrane 115 driven by partial pressure differential across the membrane.

While the above embodiments refer to separating hydrocarbons from a mixture including oxygen, it is contemplated that instead of separating the hydrocarbons, a gas phase membrane can be utilized to first separate out oxygen and allowing the remaining ullage gas mixture (including hydrocarbons and nitrogen, for example) to liquid fuel 119 in tank 113. This process may be less efficient due to the low selectivity of available oxygen/nitrogen membranes and a large pressure differential may be needed. Nonetheless, such embodiments are suitable and are contemplated herein.

One having ordinary skill in the art appreciates that any suitable valves, sensors, flow control devices, power supplies, wiring, controllers, and/or any suitable mechanisms can be added to the embodiments as described hereinabove in any suitable manner without departing from scope of this disclosure. For example, a controller can be operatively connected to a valve associated with the sparging gas supply/generator, the fan, and/or any suitable sensor to control flow as a function of sensor data. In certain embodiments, a controller accepts an input from a sensor and actuates sparging gas flow in response to the input.

Embodiments avoid deposits and varnish formation by reducing oxygen, allow rejection of more heat to fuel as used such that the fuel can be heated to higher temperatures than before, and enable improved system thermal management. Also, embodiments can improve relight at altitude due to capturing and reinjection of hydrocarbon vapors that otherwise would have vented naturally. Moreover, nitrogen used for sparging/sweeping can enter the ullage and contributes to fuel tank inerting, causing a reduction in separate fuel tank inerting gas flow and/or possibly complete elimination there, thereby saving weight. Nitrogen can also be recycled which can reduce the need to create it on the aircraft and/or the size of a supply tank.

The methods and systems of the present disclosure, as described above and shown in the drawings, provide for deoxygenating system with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fuel deoxygenation system for an aircraft, comprising:
   a hydrocarbon recycler configured to recycle hydrocarbon vapors into liquid fuel, including:
      a housing that partially defines an ullage channel configured to fluidly communicate with both an ullage of an aircraft fuel tank and a vent, wherein the housing partially defines a hydrocarbon recirculation channel configured to fluidly communicate with a liquid portion of the fuel tank; and
      a membrane defining a sealing wall between the ullage channel and the hydrocarbon recirculation channel such that the membrane is in fluid communication with both the ullage channel and the hydrocarbon recirculation channel, wherein the membrane is configured to be permeable to hydrocarbons such that hydrocarbons in the ullage channel can pass through the membrane to the hydrocarbon recirculation channel and oxygen in the ullage channel passes through to be vented.

2. The system of claim 1, wherein the membrane is a reverse selective membrane.

3. The system of claim 1, further comprising a sparging gas supply in fluid communication with the liquid portion of the fuel tank for supplying a sparging gas to the liquid fuel.

4. The system of claim 3, wherein the sparging gas supply includes an electro-chemical converter to produce sparging gas onboard the aircraft.

5. The system of claim 3, wherein the sparging gas supply is in fluid communication with the fuel tank through the hydrocarbon recirculation channel to sweep the hydrocarbon recirculation channel.

6. The system of claim 1, further comprising a fuel tank inerting system in fluid communication with the ullage of the fuel tank to provide the ullage with an inerting gas.

7. The system of claim 1, further comprising a sparging gas separator disposed between the hydrocarbon recycler and the vent configured to recirculate sparging gas to the system and to pass oxygen to the vent.

8. The system of claim 1, further comprising a prime mover disposed in fluid communication with the hydrocarbon recirculation channel to pressurize the hydrocarbon gas to flow to the liquid portion of the fuel tank and bubble into the liquid fuel.

9. The system of claim 1, further comprising an ullage prime mover disposed in fluid communication with the ullage and configured to pressurize ullage gas to flow to the hydrocarbon recycler.

10. A method for deoxygenating fuel in an aircraft, comprising:
   sparging a liquid fuel of a fuel tank with a sparging gas to displace oxygen from the liquid fuel into an ullage of the fuel tank to create an ullage gas;
   separating hydrocarbons from the ullage gas;
   venting the ullage gas containing oxygen after separating hydrocarbons from the ullage gas; and
   recirculating the hydrocarbons into the liquid fuel.

11. The method of claim 10, wherein the sparging gas is an inert gas.

12. The method of claim 11, wherein the sparging gas is nitrogen.

13. The method of claim 12, wherein separating hydrocarbons includes passing the ullage gas over a reverse-selective membrane that is configured to permeate hydrocarbons and not oxygen.

14. The method of claim 10, further comprising separating the sparging gas from the ullage gas before venting the ullage gas.

15. The method of claim 14, further comprising recirculating the sparging gas to the liquid fuel.

16. The method of claim 10, wherein the sparging gas serves to inert the ullage of the fuel tank.

* * * * *